(12) United States Patent
O'Neal

(10) Patent No.: US 7,649,983 B2
(45) Date of Patent: *Jan. 19, 2010

(54) APPARATUS AND METHOD FOR CHANNEL-TRANSPARENT MULTIMEDIA BROADCAST MESSAGING

(75) Inventor: Stephen C. O'Neal, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 549 days.

This patent is subject to a terminal disclaimer.

(21) Appl. No.: 11/315,666

(22) Filed: Dec. 22, 2005

(65) Prior Publication Data

US 2006/0171514 A1    Aug. 3, 2006

Related U.S. Application Data

(63) Continuation of application No. 09/874,457, filed on Jun. 5, 2001, now Pat. No. 7,035,383, which is a continuation of application No. 09/240,436, filed on Jan. 29, 1999, now abandoned.

(51) Int. Cl.
    *H04M 1/64*    (2006.01)
(52) U.S. Cl. .............. 379/88.13; 379/88.16; 379/88.17; 379/88.18; 379/88.22; 370/351
(58) Field of Classification Search ......... 370/351–356; 379/67.1, 70, 72, 76, 81, 88.01, 88.04, 88.11–88.18, 379/88.22, 218.01, 222, 223, 265.01
See application file for complete search history.

(56) References Cited

U.S. PATENT DOCUMENTS

| | | | |
|---|---|---|---|
| 5,459,717 A * | 10/1995 | Mullan et al. ............... | 370/351 |
| 5,608,786 A | 3/1997 | Gordon | |
| 5,630,060 A | 5/1997 | Tang et al. | |
| 5,740,231 A | 4/1998 | Cohn et al. | |
| 5,742,763 A | 4/1998 | Jones | |
| 5,742,905 A | 4/1998 | Pep et al. | |
| 5,764,899 A | 6/1998 | Eggleston et al. | |
| 5,802,510 A | 9/1998 | Jones | |
| 5,809,128 A | 9/1998 | McMullin | |
| 5,870,454 A | 2/1999 | Dahlen | |

(Continued)

FOREIGN PATENT DOCUMENTS

EP    0854655 A2    7/1998

(Continued)

*Primary Examiner*—Md S Elahee
(74) *Attorney, Agent, or Firm*—Senniger Powers LLP

(57) ABSTRACT

An apparatus and method are provided for addressing and broadcasting a message to recipients having both telephone network-based receiving devices and data network-based receiving devices. The apparatus includes a message router that translates the broadcast message into individual messages that are addressed to each message recipient in a format, e.g., voice, text, email, fax, pager, compatible with each message recipient's receiving device. The individual messages are transmitted by a data network server over a data network. Individual messages designated for recipients having receiving devices addressable by the data network are delivered directly over the data network to the receiving devices. Individual messages designated for recipients having receiving devices addressable by the telephone network are delivered over the data network first to a telephone network server. The telephone network server then delivers the individual messages to the telephone network-based receiving devices over the telephone network via a local telephone switch corresponding to the telephone network server.

20 Claims, 6 Drawing Sheets

U.S. PATENT DOCUMENTS

| | | |
|---|---|---|
| 5,943,648 A | 8/1999 | Tel |
| 5,970,122 A | 10/1999 | LaPorta et al. |
| 5,987,100 A | 11/1999 | Fortman et al. |
| 6,014,429 A | 1/2000 | LaPorta et al. |
| 6,085,101 A | 7/2000 | Jain et al. |
| 6,188,683 B1 | 2/2001 | Lang et al. |
| 6,215,858 B1 | 4/2001 | Bartholomew et al. |
| 6,360,256 B1 | 3/2002 | Lim |
| 6,389,114 B1 | 5/2002 | Dowens et al. |
| 6,438,217 B1 | 8/2002 | Huna |
| 6,449,646 B1 | 9/2002 | Sikora et al. |
| 6,493,685 B1 | 12/2002 | Ensel et al. |
| 6,636,587 B1 | 10/2003 | Nagai et al. |
| 6,671,061 B1 | 12/2003 | Joffe et al. |
| 2002/0001371 A1 | 1/2002 | Goldberg et al. |

FOREIGN PATENT DOCUMENTS

| | | |
|---|---|---|
| JP | 09214560 | 8/1997 |
| WO | 9620553 | 7/1996 |
| WO | 9844708 | 10/1998 |

* cited by examiner

Data Network Broadcast Messaging

*Channel-Transparent Broadcast Messaging*

*Method for Channel-Transparent Multimedia Broadcast Messaging*

APPARATUS AND METHOD FOR CHANNEL-TRANSPARENT MULTIMEDIA BROADCAST MESSAGING

BACKGROUND OF THE INVENTION

1. Field of the Invention

This invention relates in general to the field of broadcast messaging, and more particularly to an apparatus and method for delivering a broadcast message to a group of recipients having disparate receiving devices.

2. Description of the Related Art

The advent of the telephone at the turn of the century presented a new form of communication to the population at large. Whereas prior messages were delivered directly to a message recipient either by mail, telegraph, or personal courier, telephones introduced a new option for delivering a message. More urgent matters were treated immediately with a telephone message while less important matters were relegated to the mail. The option to call or write notwithstanding, a message originator still knew that the message itself was being delivered to a particular geographic location, presumably in the presence of a message recipient. One of the most elementary systems for broadcasting a message to several recipients was known as a messaging service. To utilize such a service, the message originator selected message recipients and either wrote or dictated a message to an operator who, in turn, distributed the broadcast message serially, to each message recipient over the telephone network.

The arrival of automated voicemail systems simply took the human element out of the broadcast distribution loop. Using a voicemail system, a message originator was able to record a broadcast message from his/her telephone and subsequently enter the telephone numbers of recipients for the message.

Facsimile machines increased the options available for a user. Using a machine connected to the telephone network, the user could electronically convert a written page into signals that were transmitted to a like machine over the telephone network. The like machine could then print out the transmitted page, thus delivering a textual message in a textual format.

Yet perhaps the most revolutionary series of events to advance the art of messaging has been the development of computer networking technologies resulting in what is now known as the Internet along with related audio recording, storage, and transmission techniques. Now a user can access the Internet from virtually any location in the world and retrieve electronic mail (email) in text form or in voice form.

Cellular phones and pagers also provide a user with the ability to send and receive messages from other than a fixed location. Cellular phone and pager technologies are on the verge of providing worldwide coverage. It will soon be possible to reach a message recipient anywhere in the world.

In addition to the above noted advances, several related problems have resulted. A first problem relates restricted distribution of a message. More specifically, a message that is entered from a device connected to the telephone network, i.e., a device having an assigned telephone number, is restricted for delivery to devices that are also connected to the telephone network. A device with a telephone number is designed to distribute messages to similar devices having telephone numbers.

Likewise, a message that is entered from a device connected to the Internet or similar data network, i.e., a device having an assigned Internet Protocol (IP) address, is restricted for delivery to devices that are also connected to the Internet. A device with an IP address is designed to distribute messages to similar devices having IP addresses.

A second problem regards the format of a particular message. Since mechanisms are now available to send both voice and text messages over both the telephone network and the Internet, messages for a particular recipient must be provided in a format that is compatible with the particular recipient's receiving device. For example, a computer can function as a facsimile machine, but special purpose application software is required to translated facsimile format to a format that can be viewed on a computer monitor.

Consequently, if a user today desires to send a message to a number of recipients where some of the recipients have telephones and some of the recipients have computers for accessing electronic mail, the user must enter and transmit the message twice. A first message must be broadcast to recipients on the telephone network and a second message must be broadcast to recipients over the Internet.

Therefore, what is needed is an apparatus for broadcasting a message to multiple recipients, where the message format and transmission network are transparent to the message originator.

In addition, what is needed an apparatus providing the capability to enter a message in email format and to have the message delivered to a telephone in voicemail format.

Furthermore, what is needed is an apparatus for broadcasting a message to a number of recipients having receiving devices that are addressable over both the telephone network and a data network.

Moreover, what is needed is a method for broadcasting a message that permits a message originator to specify a voicemail number, an email address, or a facsimile number for intended recipients.

SUMMARY

To address the above-detailed deficiencies, it is an object of the present invention to provide a message broadcast apparatus capable of sending a message to several recipients, where the message format and transmission network are transparent to the message originator.

Accordingly, in the attainment of the aforementioned object, it is a feature of the present invention to provide an apparatus for sending a broadcast message to a first recipient and a second recipient, the first recipient having a first receiving device addressable over a data network and the second recipient having a second receiving device addressable over a telephone network. The apparatus includes a message router, a data network server, and a telephone network server. The message router translates the broadcast message into a first message and a second message, the first message being in a first format for delivery to the first receiving device, and the second message being in a second format for delivery to the second receiving device. The data network server is coupled to the message router. The data network server transmits the first and second messages over the data network, and delivers the first message to the first receiving device. The telephone network server is coupled to the data network server. The telephone network server receive the second message from the data network and delivers the second message to the second receiving device over the telephone network.

An advantage of the present invention is that a message originator can contact a recipient by several means to ensure that urgent messages have a high probability of being received by the recipient.

Another object, of the present invention is to provide an apparatus for entering a message in email format and for delivering the message to a telephone in voicemail format.

In another aspect, it is a feature of the present invention to provide a message broadcasting apparatus. The message broadcasting apparatus has a message router, a data network server, and a telephone network server. The message router routes a broadcast message to a first receiving device and a second receiving device, where the first receiving device is connected to a data network and the second receiving device is connected to a telephone network. The data network server is coupled to the message router. The data network-server transmits the broadcast message over the data network and delivers the broadcast message to the first receiving device. The telephone network server is coupled to the data network server. The telephone network server retrieves the broadcast message from the data network and delivers the broadcast message to the second receiving device over the telephone network.

Another advantage of the present invention is that a message originator only need enter a message one time for delivery to multiple recipients.

A further object of the invention is to provide an apparatus for broadcasting a message to a number of recipients having receiving devices that are addressable over both the telephone network and a data network.

In a further aspect, it is a feature of the present invention to provide a message broadcasting system. The message broadcasting system has message entry logic, a message routing computer, a data network computer, and a telephony computer. The message entry logic is for originating a broadcast message addressed to recipients, wherein a first recipient is accessed over the internet and a second recipient is accessed over a telephone network. The broadcast message includes a first message that has within a first IP address corresponding to the first recipient. The broadcast message also includes a second message that has within a second IP address and a telephone number corresponding to the second recipient. The message routing computer is coupled to the message entry logic. The message routing computer formats the first and second messages and designates a telephone switch whereby the second recipient is contacted. The data network computer is coupled to the message routing computer and transmits the first and second messages over the internet. The telephony computer is coupled to the data network computer. The telephony computer directs the telephone switch to access the second recipient and deliver the second message to the second recipient, where the second IP address uniquely identifies the telephony computer.

A further advantage of the present invention is that a recipient on the telephone network can be messaged from a device on the Internet.

Yet another object of the present invention is to provide a method for broadcasting a message that permits a message originator to specify a voicemail number, an email address, or a facsimile number for intended recipients.

In yet another aspect, it is a feature of the present invention to provide a method for sending a broadcast message to a first receiving device and a second receiving device, the first receiving device being addressed by a telephone network and the second receiving device being addressed by a data network. The method includes translating the broadcast message into a first message and a second message, the first message being in a first format compatible with the first receiving device and the second message being in a second format compatible with the second receiving device; sending, via the data network, the first message to the first receiving device and the second message to a telephone switch; causing the telephone switch to access the second receiving device; and delivering the second message over the telephone network.

Yet another advantage of the present invention is that messages can be broadcast to recipients that have receiving media different from that of the message originator.

BRIEF DESCRIPTION OF THE DRAWINGS

These and other objects, features, and advantages of the present invention will become better understood with regard to the following description, and accompanying drawings where.

DETAILED DESCRIPTION

In light of the above background on message broadcast techniques, several related art examples will now be discussed with reference to FIGS. 1 through 3. These examples illustrate how present day message broadcast systems restrict delivery of a broadcast message to recipients having receiving devices that are connected to the same communication network as the broadcast system, a particular difficulty being the inability to direct a broadcast message to both a data network addressee (e.g., electronic mail) and a telephone network addressee(e.g., voicemail). Following this discussion, a detailed description of the present invention will be provided with reference to FIGS. 4 through 6. The present invention permits a user to address a broadcast message for delivery to both data network devices and telephone network devices. The present invention additionally delivers the message to all addressees over communication channels that are transparent to the message originator. The message is delivered to each recipient in a form (e.g., email, facsimile, voicemail) that is commensurate with his/her receiving device.

Figure 1:
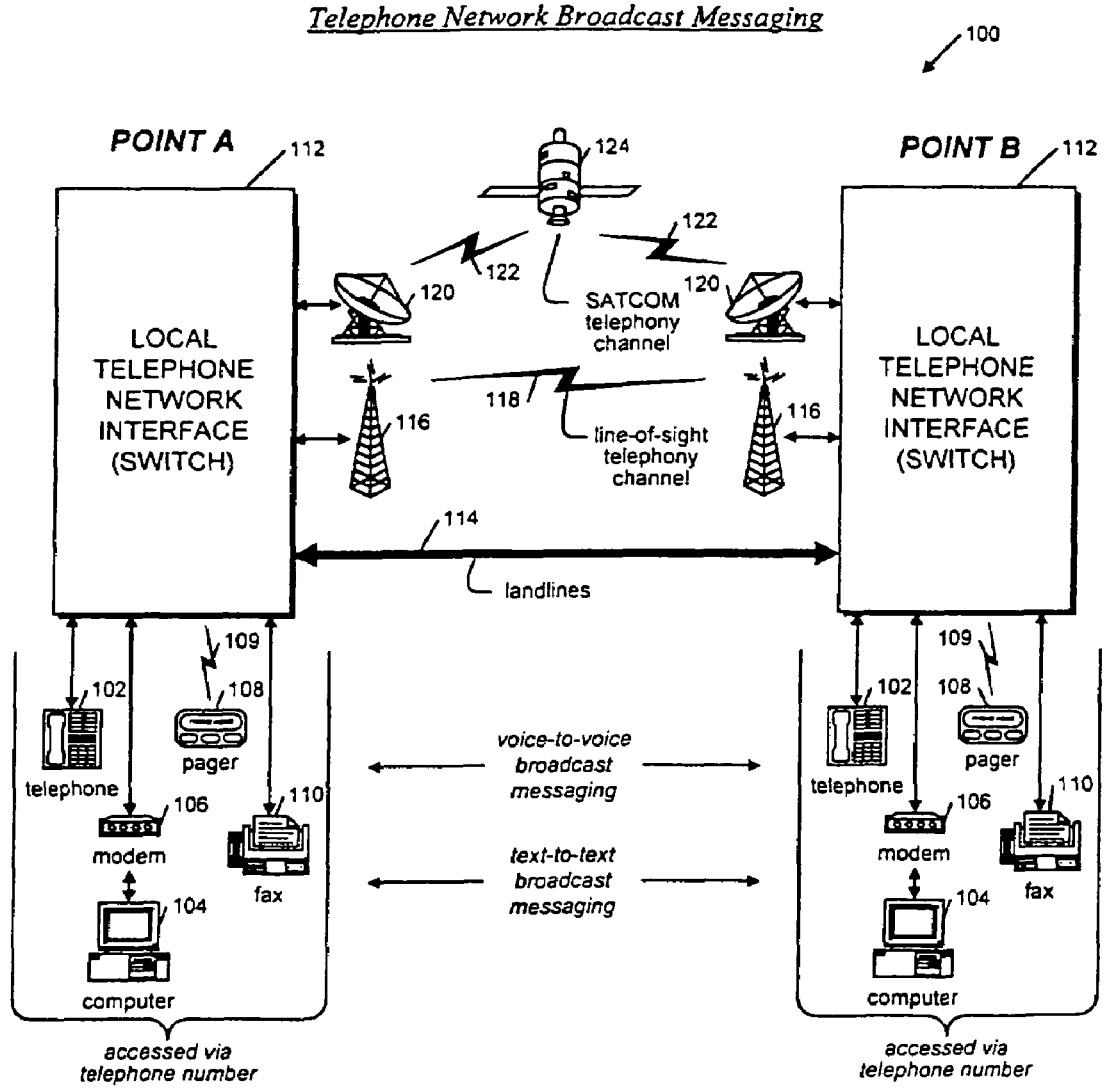
FIG. 1 is a block diagram illustrating related art broadcast messaging techniques for delivery to recipients over a telephone network.

Referring to FIG. 1, a block diagram 100 is presented illustrating related art broadcast messaging techniques for delivery to recipients over a telephone network. The block diagram 100 shows two local telephone network interfaces 112, one 112 at POINT A and one 112 at POINT B. The block diagram 100 also depicts various devices connected to the local telephone network interfaces 112: a telephone 102, pager 108, a facsimile (fax) machine 110, and a modem 106 that provides connectivity for a computer 104. In addition three communication channels are shown: a hardwired channel 114, a radio frequency (RF) line-of-sight (LOS) channel 118, and a satellite communications (SATCOM) channel 122.

In operation, each of the devices 102, 108, 110, 106/104 are provided with a unique address, or telephone number, so that they may be readily identified by the local telephone network interface 112 for purposes of message transmission and message receipt. The local telephone network interface 112 is also known as a local switch 112. The local switch 112 is the point where local devices 102, 108, 110, 106/104 interface to the telephone network communication channels 114, 118, 122. A transmitting local device 102, say a telephone 102 at POINT A, sends a message to a compatible receiving device, say a telephone 102 at POINT B, by providing a telephone number assigned for the receiving device 102 at POINT B to the local switch 112 at POINT A. The local switch 112 at POINT A then transmits the message to the local switch 112 at POINT B via the hardwired channel 114, the RF LOS channel 118, the SATCOM channel 122, or a combination thereof. The local switch 112 at POINT B then delivers the message to the receiving device 102. For a given message, routing logic (not shown) within the local switch 112 at POINT A determines which telephony channel 114, 118, 122 or combination of channels 114, 118, 122 to use for transmission. This determination is based upon a number of factors to include the geographic separation of POINT A and POINT B and the availability of a channel 114, 118, 122 at the time the given message is transmitted. For example, a first message from San Francisco to San Jose, because the two points are only a few miles apart, may be transmitted over the hardwired, or landline, channel 114. This channel 114, modulates electrical signals over wires or fiber-optic cables to communicate the first message between San Francisco and San Jose. A second message from San Francisco to Los Angeles, because the two points are separated by hundreds of miles, may be transmitted over the RF LOS channel 118. This channel translates electrical signals provided by the local switch 112 in San Francisco to RF signals and transmits the second message between a number of RF LOS antennas 116 for delivery to Los Angeles. The RF signals are then translated back to electrical signals compatible with receiving devices in Los Angeles. A third message from San Francisco to Paris, because the two points are separated by thousands of miles, may be transmitted over the SATCOM channel 122. This channel translates electrical signals provided by the local switch 112 in San Francisco to RF signals and transmits the third message between a transmitting satellite antenna 120 to a satellite 124 above the Earth. The satellite 124 relays the third message to a receiving satellite antenna 120 near Paris. The RF signals are then translated back to electrical signals compatible with receiving devices in Los Angeles. One skilled in the art will appreciate that many factors influence the medium 114, 118, 122 chosen for transmission of a given message over the telephone network and that the choice of medium 114, 118, 122 is transparent to both the message originator and the message recipient. A message between San Francisco and Paris could just as well be transmitted by landlines 114 as by a satellite 124—what the originator and recipient hear is words spoken over a telephone 102.

Regardless of the telephony channel 114, 118, 122 provided for communication of a message, it is important to note that the local switch 112 is the point of interface to the telephone network and that each device 102, 108, 110, 106/104 connected to the network is addressed by a unique telephone number. To be accessed, that is, to transmit and receive messages, a device 102, 108, 110, 106/104 must be connected to the telephone network and must have an assigned telephone number. Use of the telephone number is the only way to address a device 102, 108, 110, 106/104. Moreover, a device 102, 108, 110, 106/104 connected to the telephone network may not be accessed via any other network except through a local switch 112.

Although messages via the telephone network are modulated for reliable transmission in accordance with a particular telephony channel 114, 118, 122, the format of such messages can differ. For instance, digitized voice files are normally transmitted between two telephones 102, thus providing voice-to-voice messaging. One skilled in the art will appreciate that there are several digitized voice file formats in use today and that off-the-shelf products are available for translation from one file format to the next. But voice-to-voice messaging is not the only form of messaging over the telephone network. Text-to-text messaging is also available. A textual item may be entered into a fax machine 110 at POINT A and transmitted to a compatible fax machine 110 at POINT B, thus achieving text-into-text messaging. Yet, file formats for a fax are different than for digitized voice. And as with digitized voice, a number of files formats are in use today. Virtually all fax machines 110 provide transparent translation between fax file formats.

A pager 108 provides the capability to receive a textual message that is entered via a telephone keypad or similar alphanumeric entry device. The pager 108 is actually addressed over an RF paging channel 109 rather than a landline 114. As a result, a recipient within reach of the RF paging channel 109 can be provided with a message in written form that is entered from a telephone 102. Like the telephone 102 and fax machine 110, several message file formats are in use today for pagers 108.

The computer 104 provides the capability to send either a voice format message or a text format message over the telephone network. The modem 106 interfaces the computer 104 to a local switch 112 and translates voice and file formats provided by the computer 104 into electrical signals compatible with the telephone network. Most present day computers 104 that are connected to the telephone network provide the capability to transmit and receive a voice message, or voice mail, and to transmit and receive a text message in the form of an electronic file or a fax. Translation capabilities are provided for translation of, say, a fax file format to a format for displaying a fax on a computer monitor (not shown).

It is possible to send a message over the telephone network to more than one receiving device 102, 106/104, 108, 110. A message addressed to more than one receiving device 102, 106/104, 108, 110 is called a broadcast message. In essence, the broadcast message is entered once from an originating device 102, 106/104, 108, 110 and is then broadcast to selected recipients. In practice, however, the broadcast message is actually translated into individual messages corresponding to each message recipient and the individual messages are subsequently transmitted to each message recipient over the telephone network. For example, it is trivial to address a fax to several receiving fax machines 110 or computers 104 by entering the corresponding telephone numbers on the broadcast fax machine 110. The broadcast fax machine 110 then contacts each recipient individually over the telephone network. A more complex case is illustrated by a message originator broadcasting a voicemail to both a receiving computer 104 and a receiving telephone 102 by entering a voice message into an originating computer 104 and selecting the telephone numbers corresponding to the intended recipients.

One skilled in the art will appreciate that a number of variations exist for broadcast messaging over the telephone network that are not discussed above, to include voice-to-text and text-to-voice translations provided for the deaf via a TTY device connected to the telephone network. Yet, to address a broadcast message to devices 102, 106/104, 108, 110 over the telephone network requires the provision of telephone numbers for each message recipient.

The telephone network has been predominately used for commercial messaging since the early 1900's. But as of the mid-1980's commercial messaging practices began to change with the advent of the internet. The internet is a worldwide network of computers that are connected together via a data network that is distinct from the telephone network. And the primary factor that distinguishes devices connected to the internet from those connected to the telephone network is that devices connected to the internet are not addressed by telephone numbers; they are addressed with a designator known as an internet protocol (IP) address. A more detailed description of messaging over a data network is provided with reference to FIG. 2.

Figure 2:
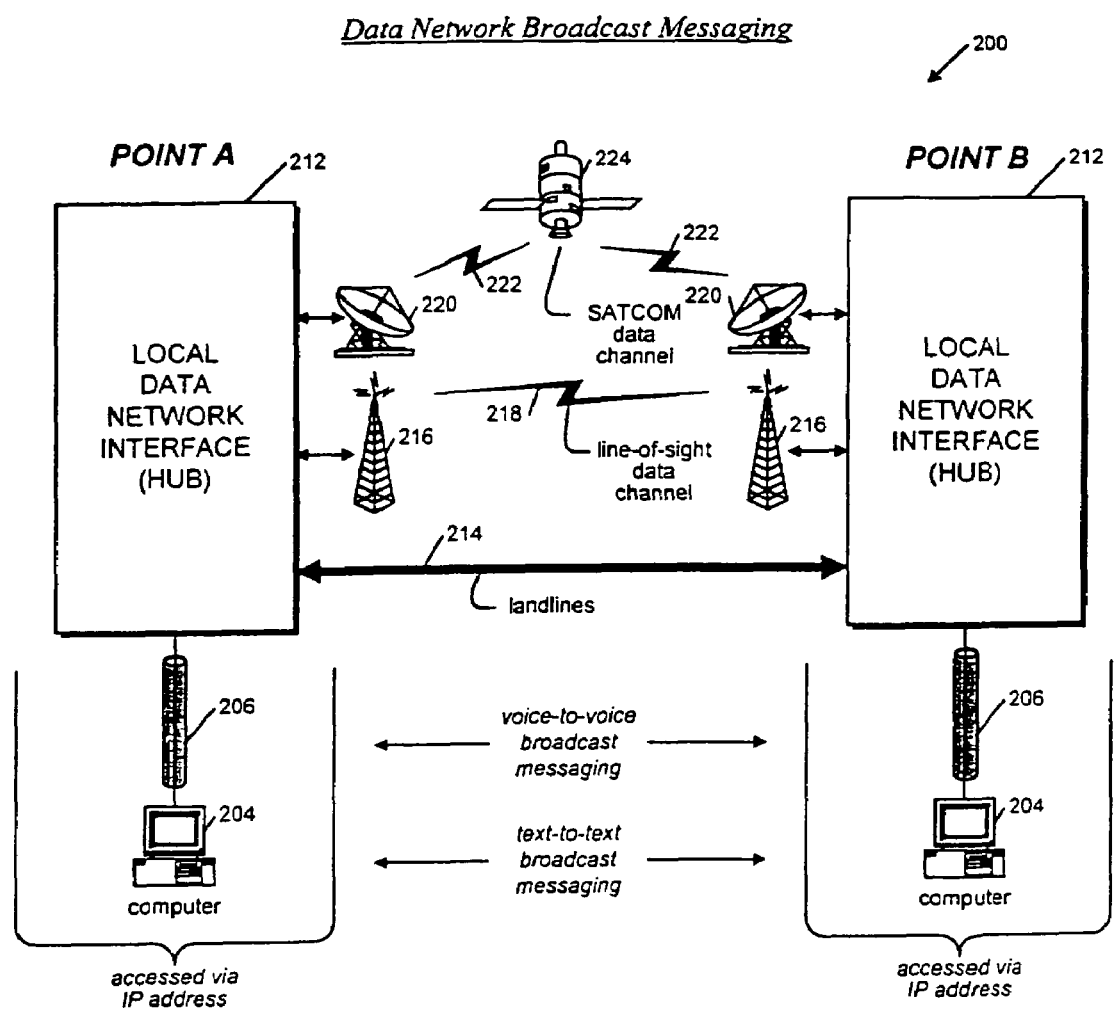
FIG. 2 is a block diagram illustrating related art broadcast messaging techniques for delivery to recipients over a data network.

Referring to FIG. 2, a block diagram 200 is presented illustrating related art broadcast messaging techniques for delivery to recipients over a data network. The block diagram 200 shows two local data network interfaces 212, one 212 at POINT A and one 212 at POINT B. The block diagram 100 also depicts computers 204 connected to the local data network interfaces 112 via data network medium 206. The data network medium 206 can be a local area network, a wide area network, a cable modem, or any of a number of present day mechanisms for connecting a computer 204 to a data network. Like the telephone network of FIG. 1, three communication channels are shown: a hardwired channel 214, a radio frequency (RF) line-of-sight (LOS) channel 218, and a satellite communications (SATCOM) channel 222.

In operation, each computer 204 connected to the data network is provided with a unique IP address, so that it may be readily identified by the local data network interface 212 for purposes of message transmission and message receipt. The local data network interface 212 is also known as a local hub 212. The local hub 112 is the point where a computer 204 interfaces to the data network communication channels 214, 218, 222. A transmitting computer 204 at POINT A sends a message to a receiving computer 204 at POINT B by providing an IP address assigned for the receiving computer 204 at POINT B to the local hub 212 at POINT A. The local hub 212 at POINT A then transmits the message to the local hub 212 at POINT B via the hardwired channel 214, the RF LOS channel 218, the SATCOM channel 222, or a combination thereof. The local hub 212 at POINT B then delivers the message to the receiving computer 204. For a given message, routing logic (not shown) within the local hub 212 at POINT A determines which data network channel 214, 218, 222 or combination of channels 214, 218, 222 to use for transmission. This determination is based upon a number of factors to include the geographic separation of POINT A and POINT B and the availability of a channel 214, 218, 222 at the time the given message is transmitted. Operation of each of the data network channels 214, 218, 222 and their associated elements 216, 220, 224 is similar to like telephone network elements of FIG. 1, the hundreds digit being replaced with a 2. One skilled in the art will likewise appreciate that many factors influence the medium 214, 218, 222 chosen for transmission of a given message over the data network and that the choice of medium 214, 218, 222 is transparent to both the message originator and the message recipient. A message between San Francisco and Paris could just as well be transmitted by landlines 214 as by a satellite 224.

Regardless of the data channel 214, 218, 222 provided for communication of a message, it is important to note that the local hub 212 is the point of interface to the data network and computers 204 connected to the network are addressed by unique IP addresses. To be accessed, that is, to transmit and receive messages, a computer 204 must be connected to the data network and must have an assigned IP address. Use of the IP address is the only way to address a computer 204 connected to the data network. Moreover, a computer 204 connected to the data network may not be accessed via any other network except through a local hub 212.

Although messages via the data network are modulated for reliable transmission in accordance with a particular data network channel 214, 218, 222, the format of such messages can differ. For instance, technology advances permits digitized voice files to be transmitted between two computers 204, thus providing voice-to-voice messaging. One skilled in the art will appreciate that there are several digitized voice file formats in use today and that off-the-shelf products are available for translation from one file format to the next. These formats include wave format (i.e., .wav files) and real-audio format (.ra files). But perhaps the most prevalent forms of messaging exercised by computers 204 today is text-to-text. A textual item is entered into a computer 204 at POINT A and transmitted to a computer at POINT B, thus achieving text-to-text messaging, principally in the email format. And most email application programs for computers today provide transparent translation and presentation of both voice and text messages.

Like messaging over the telephone network, it is possible to send a broadcast message over the data network to more than one receiving computer 204. In fact, present day email applications make it possible to enter one textual message, or to record a voice message, and then broadcast the message to numerous recipients simply by selecting their corresponding addresses from an addressing source provided by the email application. Yet, similar to broadcasting over the telephone network, a data network broadcast message is actually translated into individual messages corresponding to each message recipient and the individual messages are subsequently transmitted to each message recipient over the data network.

One skilled in the art will appreciate that a number of variations exist for broadcast messaging over the data network that are not discussed above, to include voice-to-text and text-to-voice translations. And there are a number of special purpose devices that can be connected to the data network for special communication scenarios. These devices are referred to in the larger sense in this application simply as computers 204 because to address a broadcast message to such devices 204 over the data network requires the provision of an IP address for each message recipient.

It is well understood that telephonic communication channels 114, 118, 122 are the primary channels for transmission of information over the internet and other private data networks. Nevertheless, though telephone channels 114, 118, 122 function as the backbone of a data network, the distinction alluded to above remains: with rare exception, to address a message to a computer 204 or other device connected to a data network, the recipient's IP address must be provided.

Enabling technologies have proliferated in more recent years to the extent that the lines between telephone network messaging and data network messaging are becoming blurred, particularly from the standpoint of a user. A user desires to enter a message one time, in a format compatible with his/her data entry device, and then broadcast this message to a number of recipients, without regard to characteristics of their individual receiving devices. He/She furthermore has no interest in whether the receiving device is a telephone 102 connected to the telephone network, or a computer 204 connected to the data network, or some other device having either an IP address or a telephone number assigned to it. His/Her chief desire is to communicate information to recipients, not to interact with a host of disparate receiving devices. Yet a number of obstacles have yet to be overcome that allow such seamless broadcast communication to occur. FIG. 3 summarizes the present day capabilities and limitations of broadcast messaging between telephone network devices and data network devices.

Figure 3:
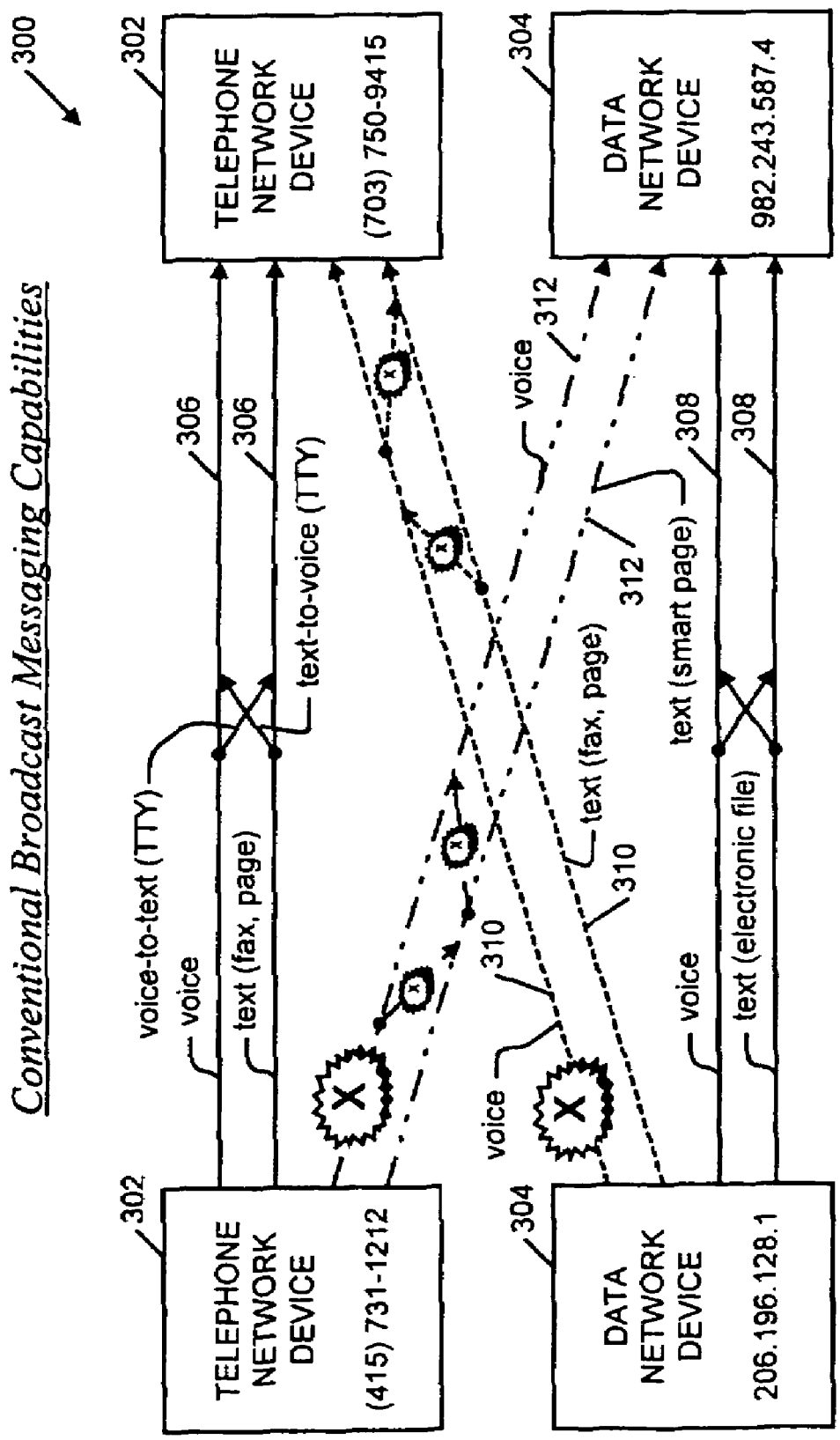
FIG. 3 is a diagram illustrating related art broadcast messaging capabilities for delivery to recipients over the telephone network and the data network.

Referring to FIG. 3, a diagram 300 is presented illustrating related art broadcast messaging capabilities for delivery to recipients over the telephone network and the data network. The diagram 300 shows two telephone network devices 302: a first device 302 having a telephone number of (415)731-1212 and a second device 302 having a telephone number of (705)750-9415. The diagram 300 also depicts two data network devices 304: a first data network device 304 having an IP address of 206.196.128.1 and a second data network device 304 having an IP address of 982.243.587.4. The diagram 300 also depicts two telephone network communication channels 306: a voice form channel 306 and a text form channel 306. Two data network communication channels 308, a voice form channel 308 and a text form channel 308 are also presented. Two data-to-telephone network channels 310 are depicted in the diagram 300 along with two telephone-to-data network channels 312. The inter-network channels 310, 312 are depicted as dotted lines in the diagram 300 because such channels 310, 312 are presented only for the purposes of discussion; present day implementations of inter-network channels 310, 312 exist only at a rudimentary level.

Operationally, as was discussed with reference to FIG. 1, it is possible today to broadcast both voice form and text form messages over telephone network devices 302. For broadcasting of voice messages, i.e., broadcast voicemail, telephones 302 are most often used to originate and receive. For broadcasting of fax messages, fax machines 302 are most often used to originate and receive. A computer equipped with a modem 302 or fax modem 302 can be used to originate or receive either voicemail or facsimiles. Both voice form messages and text form messages are transmitted over the telephone communication channels 306. Recipients of such messages are addressed by their corresponding telephone number.

But a computer 302 connected to the telephone network must have special purpose software installed to translate voice-to-text format or text-to-voice format. Hence, without special purpose software, a voicemail received by a computer 302 must be heard, not read. Furthermore, a fax must be read, not heard. Special purpose software is available to provide voice-to-text and text-to-voice translation, for example as a TTY aid for the deaf, but such software is rarely found in desktop computing systems.

As was discussed with reference to FIG. 2, it is possible today to broadcast both voice form and text form messages over data network devices 304. For broadcasting of voice messages, i.e., broadcast voicemail, computers 304 are most often used to originate and receive. Digitized voice file formats are used by the computers 304 to send and receive streaming audio. Email is the most common embodiment of text form messaging over data network channels 308 today. And although email addressing mechanisms are presented to a user in the form of an email address like joe@pto.gov, one skilled in the art will comprehend that the email itself is routed to a specific computer 304 having a unique IP address. To translate voice-to-text or text-to-voice, as was discussed above, requires special purpose software not commonly found in desktop systems 304.

Present day mechanisms do not allow a user to direct a voice format message from a telephone 302 connected to the telephone network to a receiving device 304 connected to a data network. It is possible, to direct a text format message from a device 302 called a smart pager 302 to a receiving device connected to a data network-but only with human intervention. For example, a smart pager user types in a message on his/her smart pager 304 and selects an email address of a recipient. The message is broadcast over the telephone network to a paging center, where a technician intercepts and forwards the message to the recipient over the data network. It is also not possible to enter a voice message over a telephone network device 302 and deliver it as a text format message to a data network device 304. Furthermore, a user cannot enter a text message from a telephone network device 302 and deliver it as a voice message to a data network device, without the employment of special translation software.

Mechanisms exist today to send a fax or a page from a data network device 304 to a telephone network device 302. The fax and page are virtually always entered and received in text format. Special purpose translation software is required to perform text-to-voice translation. Present day mechanisms do not provide the capability for a user to enter a voice message over a data network device and deliver it to a telephone network device.

In summary, both the telephone network and data network extend virtually all around the world. And it is standard practice to send both voice format and text format messages over either network. But present day messaging systems do not provide a user with the capability to broadcast a message to a first recipient connected to the data network and a second recipient connected to the telephone network, without human intervention. Either an expensive messaging service is required, or the user is required to send his message twice, once from a data network device 304 to the first recipient and again from a telephone network device 304 to the second recipient. This is a problem. Furthermore, some receiving devices 302, 304 are primarily voice based, that is, they 302, 304 provide no capability to receive text format messages. A telephone is an example of a voice based device. Other receiving devices 302, 304 are primarily text based, such as a fax machine. This too is a problem, because one skilled in the art will appreciate that special purpose translation software is not commonly found in any of the standard receiving devices 302, 304.

The present invention overcomes the above noted obstacles to both inter-network broadcast messaging and message format translation by providing channel-transparent messaging and format translation via servers connected to both a data network and a telephone network. Routing information and translation software (voice-to-text and text-to-voice translators) are resident in servers according to the present invention rather than in originating and receiving devices. The channel-transparent broadcast messaging system according to the present invention can be accessed from either the telephone network or the data network. The present invention is more specifically described with reference to FIGS. 4 through 6.

Figure 4:
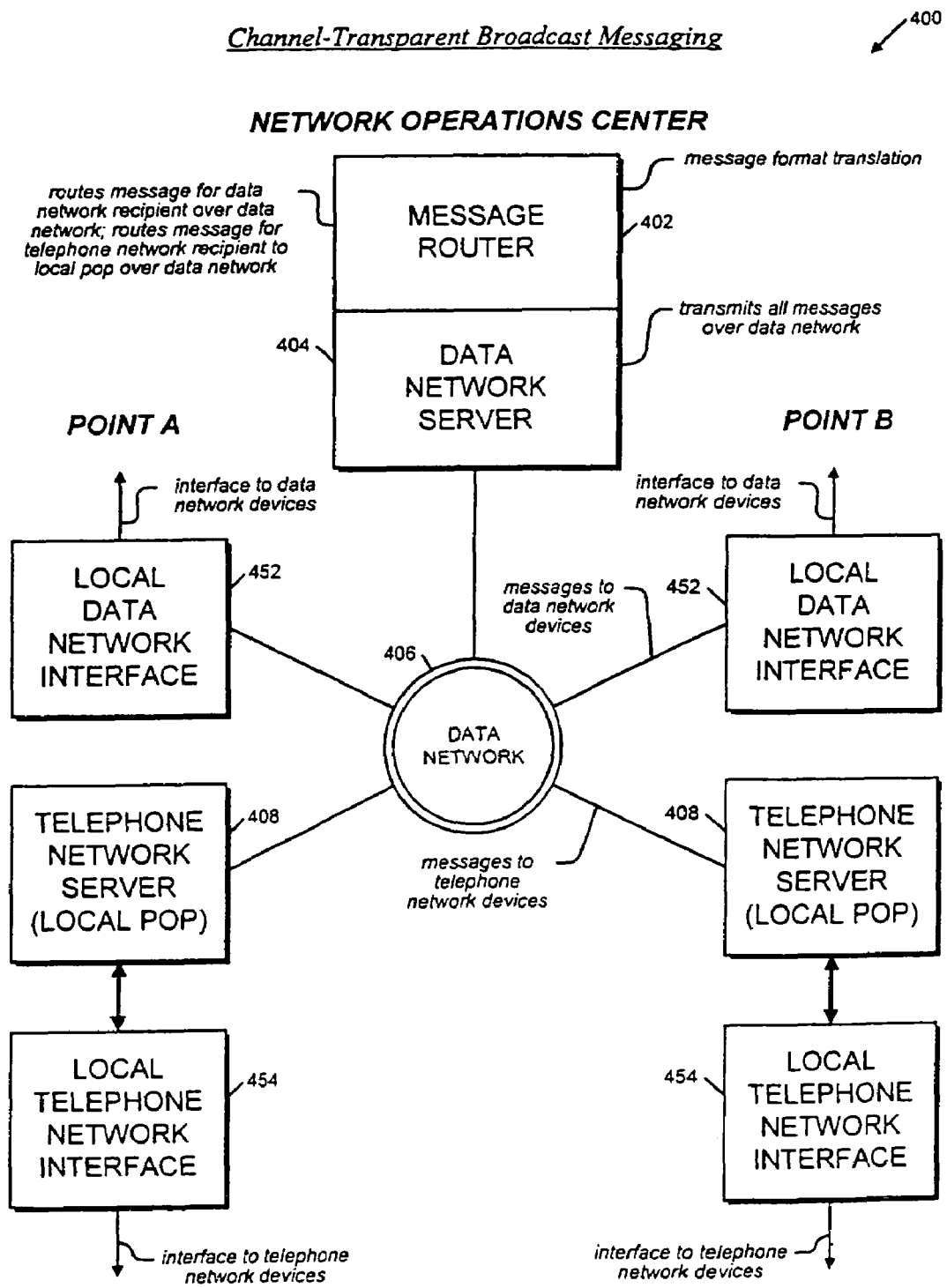
FIG. 4 is a block diagram of a channel-transparent multimedia broadcast messaging system according to the present invention.

Now referring to FIG. 4, a block diagram is presented of a channel-transparent multimedia broadcast messaging system 400 according to the present invention. The broadcast messaging system 400 includes a message router 402 and a data network server 404, both 402, 404 located at a network operations center for the broadcast messaging system 400. The data network server 404 is connected to a data network 406. In one embodiment, the data network is the Internet, also known as the. World Wide Web. In an alternative embodiment, the data network 406 is a private packet-switched network. The broadcast messaging system 400 also has telephone network servers 408 that interface with the data network 406 and that communicate with corresponding local telephone network interfaces 454, or local switches 454. The block diagram also depicts local data network interfaces 452 that are connected to the data network 406. For the ensuing discussion, the Internet embodiment is specifically described, however, one skilled in the art will appreciate that elements and means similar to those discussed for the Internet embodiment may be substituted for a private data network embodiment.

Operationally, a user (not shown) may access the broadcast messaging system 400 by either a telephone network device (not shown) or a data network device (not shown). By dialing a local telephone number, the user accesses the messaging system from his/her local switch 454. The telephone network server 408, or local point-of-presence (POP) 408, in one embodiment, is collocated with a corresponding local switch 454. The local POP 408 converts electrical signals that are modulated for communication over the telephone network into data packets for communication over the data network 406. The data packets are then sent by the local POP 408 over the data network 406 to the data network server 404 in the Network Operations Center. The data network server 404 receives the data packets transmitted over the data network and provides them to the message router 402. The broadcast messaging system 400 can also be directly accessed from a data network device such as a computer. In one embodiment, a common desktop computer equipped with a simple web browser such as Netscape® Communicator or Microsoft® Internet Explorer is used to access a web site corresponding to the network operations center. Thus the data network server 404 provides network packet transmission and reception for access to the message router 402 in the network operations center.

The message router 402 maintains account and messaging information for registered users. Each registered user is issued a telephone number, an email address, and is provided with a universal resource locator (URL) corresponding to the network operations center. For example, a user in Denver is issued a telephone number having area code 303 corresponding to the local POP in Denver, an email address of, say richardh@thinklink.com, and http://www.thinklink.com as a URL. The registered user can access his/her account by dialing the local telephone number or by using his web browser to access the URL.

For entry of messages in text form, the message router 402 provides a data entry form via the web site so that the registered user can enter a broadcast message from a computer keyboard or other device connected to the data network that is hypertext markup language (HTML) compatible. Message recipients can be manually entered via the data entry form or they may be selected from an address book resident in the message router. Using the address book, a recipient, say Rick, can be aliased to several receiving addresses to include a telephone number, pager number, fax number, and email address. The message router 402 provides the capability to address Rick via any combination of aliased receiving devices.

The message router includes translation logic and special purpose software to translate voice-to-text and text-to-voice so that a broadcast message can be seamlessly entered, transmitted, and received. For example, if a broadcast message is entered in text form and is addressed to a recipient having a voice-only receiving device, then the message router 402 translates the broadcast message into a format compatible for reception by the voice-only device prior to transmission. If the receiving device is a fax machine, the message routing logic 402 translates the broadcast message into a format compatible with the fax machine prior to transmission. What translation is required to provide the broadcast message to a receiving device is performed within the message router 402. Hence, no special purpose translation logic of software is required to be resident in an originating or receiving device.

The message router 402 routes broadcast messages designated for receiving devices connected to the data network 406 directly to the IP address of a recipient. But for recipients having receiving devices connected to the telephone network, the message router 1) embeds the telephone number of a receiving device into the broadcast message along with contact protocol for the receiving device, and 2) routes the broadcast message to the IP address of the local POP 408 corresponding to the embedded telephone number. Upon reception of the broadcast message, the local POP 408 directs the local switch 454 to call the receiving device over the telephone network. Once the call session is secured, then the local POP 408 delivers the broadcast message over the telephone network in the format provided by the message routing computer 402.

Figure 5:
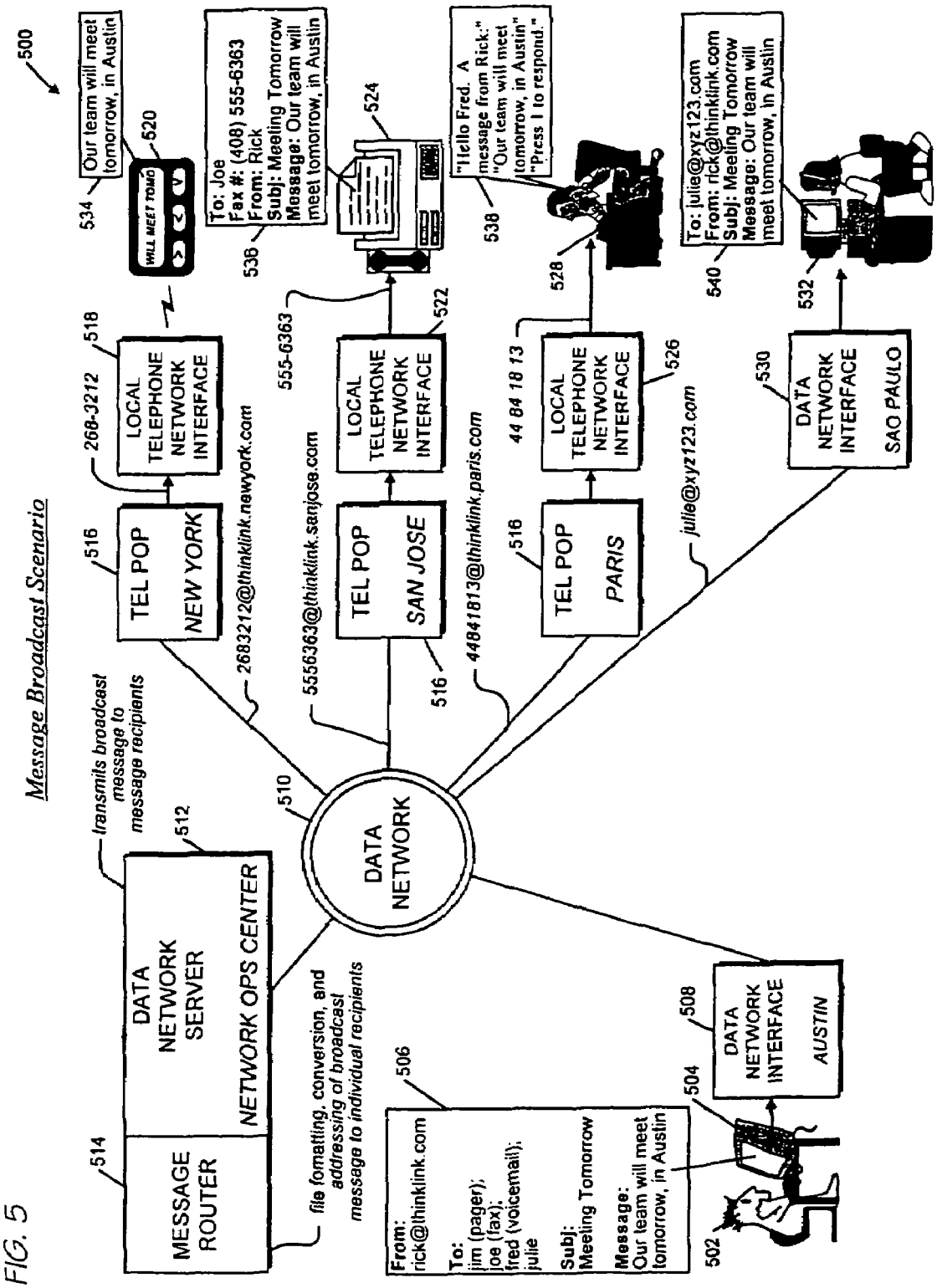
FIG. 5 is a diagram depicting a message broadcast according to the present invention to recipients having disparate receiving devices.

Now referring to FIG. 5, a diagram 500 is presented depicting a message broadcast according to the present invention to recipients having disparate receiving devices. The diagram shows a message originator 502, or registered user 502, in Austin accessing the network operations center from a computer 504, composing a broadcast message 506 for transmission to four recipients, a first recipient in New York having a pager 520 as a receiving device, a second recipient in San Jose having a fax machine 524 as a receiving device, a third recipient in Paris having a telephone 528 as a receiving device, and a fourth recipient in Sao Paulo having a computer 532 as a receiving device. The diagram 500 shows both a data network server 512 and a message routing computer 514 in the network operations center. The diagram 500 depicts transmission of the broadcast message over a data network 510 to either a data network interface 530 or to local POPs 516. The local POPs are connected to corresponding local telephone switches 518, 522, 526 for interface to receiving devices 520, 524, 528 over the telephone network.

The message originator 502 directs his/her computer 504 to access the network operations center web site by entering the URL of the website, http://www.thinklink.com, into an address field of a web browser on the computer 504. Data packets are then routed over the data network 510 via the data network interface 508 in Austin to the data network server 512 in the network operations center. The message router 514 provides appropriate web pages to the user for data entry and addressing via sending packets to the data network address of the user's computer 504. Using the data entry web page, the user 502 composes a message 506 in email format to jim's pager, joe's fax machine, fred's voicemail, and julie's default receiving device, her email address. For the purposes of message composition, it is of no concern to the user 502 what transmission channel is used to contact the recipients; what the user 502 values is that the message 506 need be entered only once.

The broadcast message 506 is provided to the network operations center over the data network 510. The data network server 512 intercepts the broadcast message packets and provides them to the message router 514. The message routing computer 514 then translates the broadcast message 506 into four messages 534, 536, 538, 540, each of the four messages 534, 536, 538, 540 corresponding to each of the message recipients.

Translation of the broadcast message 506 into a first message 534 requires that 1) the telephone number of jim's pager 520, 268-3212, be embedded, 2) the IP address of the local POP 516 in New York be used as an address for the first message 534, and 3) that the broadcast message 506 be translated to pager-compatible format. The message router 514 accomplishes these tasks and provides the first message 534 to the data network server 512 for delivery to the local POP 516 in New York.

Translation of the broadcast message 506 into a second message 536 requires that 1) the telephone number of joe's fax machine 524, 555-6363, be embedded, 2) the IP address of the local POP 516 in San Jose be used as an address for the second message 536, and 3) that the broadcast message 506 be translated into facsimile-compatible format. The message router 514 accomplishes these tasks and provides the second message 536 to the data network server 512 for delivery to the local POP 516 in San Jose.

Translation of the broadcast message 506 into a third message 538 requires that 1) the telephone number of fred's telephone 528, 44 84 18 13, be embedded, 2) the IP address of the local POP 516 in Paris be used as an address for the third message 538, and 3) that the broadcast message 506 be translated from textual email format to voice format. The message router 514 accomplishes these tasks and provides the third message 538 to the data network server 512 for delivery to the local POP 516 in Paris.

Translation of the broadcast message 506 into a fourth message 540 requires only that julie's email address be provided as a address. This is because the broadcast message 506 is already compatible with julie's receiving device 532 and because julie's receiving device 532, a computer 532, is addressable over the data network. The message router 514 supplies julie's email address and provides the fourth message 540 to the data network server 512 for delivery to a local data network interface 530 in Sao Paolo.

FIG. 5 depicts Internet-based email addresses for transmission of each of the four messages 534, 536, 538, 540. For the three messages 534, 536, 538 requiring access through a local switch 518, 522, 526, their corresponding telephone numbers have been embedded into their associated email address. Although such an embodiment is shown in the FIGURE for translation of the broadcast message 506, one skilled in the art will understand that the telephone numbers and local POP information can be embedded within a message, or within a separate message.

Following translation, the data network server 512 transmits packets corresponding to each of the four messages 534, 536, 538, 540 over the data network 510. The local POP 516 in New York intercepts the first message 534 and directs the local switch 518 to contact jim's pager 520 using the embedded telephone number 268-3212. The first message 534 is then delivered to jim's pager 520. The local POP 516 in San Jose intercepts the second message 536 and directs the local switch 522 to call joe's fax machine 524 using the embedded telephone number 555-6363. Once the call is established, the local POP 516 provides the second message 536 in fax format to joe's fax machine 524. The local POP 516 in Paris intercepts the third message 538 and directs the local switch 526 to call fred's telephone 528 using the embedded telephone number 44 84 18 13. Once the call is established, the local POP 516 provides the third message 538 in recorded voice format to fred's telephone 528. The local data network interface 530 in Sao Paolo simply routes the fourth message 540 to julie's computer 532 using her data network address, julie@xyz123.com. In the even that a local POP is not available for a particular area code/phone number, the message router will direct the message through an alternate local POP.

That server will instruction the local telephone network interface to place a long-distance call for the phone number.

The examples of FIGS. 4 and 5 show how a message 506 is broadcast according to the present invention to disparate receiving devices. The receiving devices can be connected to either the telephone network or the data network and selection of communication channel for transmission of the message to recipients is transparent to a message originator. The examples furthermore show how format incompatibilities between receiving devices are overcome by the present invention without a requirement of special purpose software, or special client applications, within the receiving devices.

Figure 6:
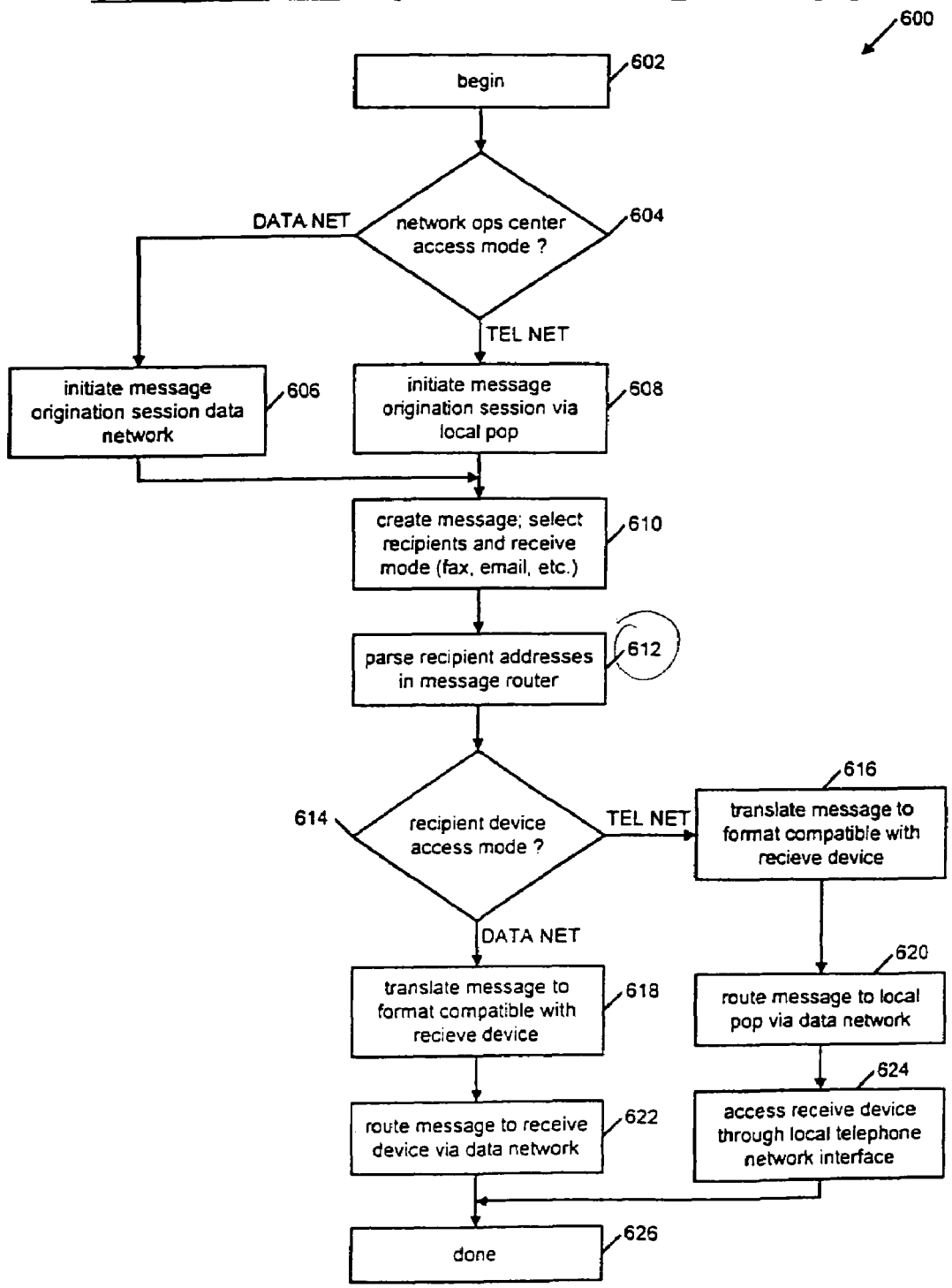
FIG. 6 is a flow chart of a method according to the present invention for broadcasting a message to receiving devices that are addressed over the telephone network and the data network.

Now referring to FIG. 6, a flow chart 600 is presented of a method according to the present invention for broadcasting a message to receiving devices that are addressed over the telephone network and the data network.

Flow begins at block 602 where a user initiates a session at the network operations center to enter a broadcast message for transmission to recipients. Flow then proceeds to decision block 604.

At decision block 604, it is determined whether the user is originating the message via a device connected to the telephone network or a device connected to a data network. If the origination device is connected to the data network, then flow proceeds to block 606. If the origination device is connected to the telephone network, then flow proceeds to block 608.

At block 606, a data network server at the network operations center intercepts packets from the data network originated by the user and establishes a session for entry of the broadcast message over the data network. Message entry forms and addressing data are provided over the data network to the user. Flow then proceeds to block 610.

At block 608, a local POP corresponding to the user's telephone number directs packets over the data network to the data network server. A message entry session is established via the local POP in a format compatible with the user's telephone network device. Flow then proceeds to block 610.

At block 610, the user creates a broadcast message in the format obtained via block 606 or 608. The user also selects recipients for the broadcast message either directly or by using his/her address book stored at the network operations center. For recipients having multiple receiving devices, the user specifies a particular receiving device, or media, for delivery. Flow then proceeds to block 612.

At block 612, message routing logic at the network operations center parses the broadcast message according to each recipient into corresponding individual messages. Flow then proceeds to decision block 614.

At decision block 614, the message router evaluates how to access each receiving device corresponding to each message recipient. If a message recipient's receiving device is connected to the telephone network, then flow proceeds to block 616. If a message recipient's receiving device is connected to the data network, then flow proceeds to block 618.

At block 616, individual messages for receiving devices connected to the telephone network are translated, if necessary, from the format in which the broadcast message was entered in block 610 into a format compatible with a designated receiving device. Flow then proceeds to block 620.

At block 620, individual messages designated for delivery to receiving devices connected to the telephone network are transmitted over the data network to a local POP corresponding to a telephone number embedded in each individual message. Flow then proceeds to block 624.

At block 624, the local POP accesses a receiving device by providing the number to a local telephone switch and subsequently delivers the broadcast message in the format provided by block 616. Flow then proceeds to block 626.

At block 618, individual messages for receiving devices connected to the data network are translated, if necessary, from the format in which the broadcast message was entered in block 610 into a format compatible with a designated receiving device. Flow then proceeds to block 622.

At block 622, the individual messages are transmitted over the data network and delivered to designated receiving devices in the format provided by block 618. Flow then proceeds to block 626.

At block 626, the method completes.

Although the present invention and its objects, features, and advantages have been described in detail, other embodiments are encompassed by the invention. For example, the present invention has been particularly characterized by transmission of messages over the Internet data network. Although the Internet is widely used today for transmission of messages between communication devices, the present invention is not dependent upon such capability being provided. The data network element according to the present invention can be embodied as a private network utilizing proprietary or leased communication channel assets.

In addition, the present invention has been specifically discussed with reference to commonly found receiving devices such as telephones, fax machines, computers, and pagers, however, such devices do not restrict application of the present invention. Any device having a telephone number or data network address that provides either voice or text format communication capability may be applied to the present invention.

Furthermore, the present invention has been characterized in terms of voice format and text format messaging because such formats are commonly employed at present. In the near future enabling technologies may permit the proliferation of video telephones or video data network communication devices. The present invention comprehends incorporation of video-based formats and devices into all aspects of broadcast messaging.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus for permitting a user to send a broadcast message via a sending device to a first recipient and a second recipient, the sending device either addressable over a data network or addressable over a telephone network connected to the data network, the first recipient having a first receiving device addressable over the data network and the second recipient having a second receiving device addressable over the telephone network, the apparatus comprising:

a message router having an address book stored within, said address book comprising aliasing information for each of the first recipient and the second recipient, said aliasing information comprising a telephone number, an email address and a uniform resource locator (URL), said address book configured to alias recipient addresses received in the broadcast message to the first receiving device of the first recipient and to the second receiving device of the second recipient, said broadcast message received from the sending device over the data network if the sending device is addressable over the data network and over the telephone network via the data network connected to the telephone network if the sending device is addressable over the telephone network, the message router configured to translate the received broadcast message into a translated first broadcast message for the first recipient and a translated second broadcast message for the second recipient, the translated first broadcast message being in a format compatible with the first receiving device for delivery to the first receiving device over the data network, the translated second broadcast message being in a format compatible with the second receiving device for delivery to the second receiving device over the telephone network via the data network, the message router configured to embed the telephone number that corresponds to the second receiving device within the translated second broadcast message, the message router configured for routing the translated first broadcast message to the first receiving device over the data network and configured for routing the translated second broadcast message and the embedded telephone number to the second receiving device over the telephone network via the data network wherein the embedded telephone number provides routing information to the telephone network for delivery of the translated second broadcast message.

2. The apparatus as recited in claim 1, wherein the broadcast message is originated in voice or text form.

3. The apparatus as recited in claim 2, wherein the first receiving device is a computer having an IP address, the IP address corresponding to the first recipient.

4. The apparatus as recited in claim 2, wherein the translated first broadcast message is delivered to the first recipient in text format as an email, or as a fax, or as a text file or wherein the translated first broadcast message is delivered to the first recipient in voice format as an electronic voice file.

5. The apparatus as recited in claim 2, wherein the second receiving device is a telephone and wherein the translated second broadcast message is delivered to the second recipient in voice format as an electronic voice file; or wherein the second receiving device is a facsimile machine and wherein the translated second broadcast message is delivered to the second recipient in text format as a facsimile; or wherein the second receiving device is a pager and wherein the translated second broadcast message is delivered to the second recipient in text format.

6. The apparatus as recited in claim 1, wherein the broadcast message is originated in text form.

7. The apparatus as recited in claim 6, wherein the first receiving device is a computer having an IP address, the IP address corresponding to the first recipient.

8. The apparatus as recited in claim 6, wherein the translated first broadcast message is delivered to the first recipient in text format as an email, or as a fax, or as a text file; or wherein the translated first broadcast message is delivered to the first recipient in voice format as an electronic voice file.

9. The apparatus as recited in claim 6, wherein the second receiving device is a telephone and wherein the translated second broadcast message is delivered to the second recipient in voice format as an electronic voice file; or wherein the second receiving device is a facsimile machine and wherein the translated second broadcast message is delivered to the second recipient in text format as a facsimile; or wherein the second receiving device is a pager and wherein the translated second broadcast message is delivered to the second recipient in text format.

10. The apparatus as recited in claim 1, wherein the message router selects a format of the translated first broadcast message and a format of the translated second broadcast message for delivery according to receiving capabilities of the first and second receiving devices.

11. A method for permitting a user to send a broadcast message via a sending device to a first recipient and a second recipient, the sending device either addressable over a data network or addressable over a telephonic network connected to the data network, the first recipient having a first receiving device addressable over the data network and the second recipient having a second receiving device addressable over the telephone network, the method comprising:

storing, in a router, an address book comprising aliasing information for registered users, said aliasing information comprising a telephone number, an email address and a uniform resource locator (URL);

aliasing, by the router via the address book, recipient addresses received in the broadcast message to the first receiving device of the first recipient and to the second receiving device of the second recipient, said aliasing further comprising receiving the broadcast message from the sending device over the data network if the sending device is addressable over the data network and over the telephone network via the data network if the sending device is addressable over the telephone network;

translating the received broadcast message into a translated first broadcast message for the first recipient and a translated second broadcast message for the second recipient, the translated first broadcast message being in a format compatible with the first receiving device for delivery to the first receiving device over the data network, the translated second broadcast message being in a format compatible with the second receiving device for delivery to the second receiving device over the telephone network via the data network;

embedding a telephone number that corresponds to the second receiving device within the translated second broadcast message, said telephone number determined by the aliasing information of the second recipient;

routing the translated first broadcast message to the first receiving device over the data network; and routing the translated second broadcast message and the embedded telephone number to the second receiving device over the telephone network via the data network wherein the embedded telephone number provides routing information to the telephone network for delivery of the translated second broadcast message.

12. The method as recited in claim 11, wherein the broadcast message is originated in voice or text form.

13. The apparatus as recited in claim 12, wherein the translated first broadcast message is delivered to the first recipient in text format as an email, or as a fax, or as a text file or wherein the translated first broadcast message is delivered to the first recipient in voice format as an electronic voice file.

14. The apparatus as recited in claim 12, wherein the second receiving device is a telephone and wherein the translated second broadcast message is delivered to the second recipient in voice format as an electronic voice file; or wherein the second receiving device is a facsimile machine and wherein the translated second broadcast message is delivered to the second recipient in text format as a facsimile; or wherein the second receiving device is a pager and wherein the translated second broadcast message is delivered to the second recipient in text format.

15. The method as recited in claim 11, wherein routing includes selecting a format of the translated first broadcast message and a format of the translated second broadcast message for delivery according to receiving capabilities of the first and second receiving devices.

16. A computer readable storage medium having computer executable instructions for execution by a router for:

storing, in the router, an address book comprising aliasing information for a first recipient and a second recipient, said aliasing information comprising a telephone number, an email address and a uniform resource locator (URL);

aliasing, by the router via the address book, a recipient address received in a broadcast message to a first receiving device of the first recipient and to a second receiving device of the second recipient, said aliasing further comprising receiving the broadcast message from a sending device over a data network if the sending device is addressable over the data network and over a telephone network via the data network if the sending device is addressable over the telephone network;

translating the received broadcast message into a translated first broadcast message of the first recipient and a translated second broadcast message of the second recipient, the translated first broadcast message being in a format compatible with the first receiving device addressable over the data network the translated second broadcast message being in a format compatible with the second receiving device addressable over the telephone network;

embedding a telephone number that corresponds to the second receiving device within the translated second broadcast message, said telephone number determined by the aliasing information of the second recipient;

routing the translated first broadcast message to the first receiving device over the data network; and routing the translated second broadcast message and the embedded telephone number to the second receiving device over the telephone network via the data network wherein the embedded telephone number provides routing information to the telephone network for delivery of the translated second broadcast message.

17. The computer readable storage medium as recited in claim 16, wherein the broadcast message is originated in voice or text form.

18. The computer readable storage medium as recited in claim 17, wherein the translated first broadcast message is delivered to the first recipient in text format as an email, or as a fax, or as a text file or wherein the translated first broadcast message is delivered to the first recipient in voice format as an electronic voice file.

19. The computer readable storage medium as recited in claim 17, wherein the second receiving device is a telephone and wherein the translated second broadcast message is delivered to the second recipient in voice format as an electronic voice file; or wherein the second receiving device is a facsimile machine and wherein the translated second broadcast message is delivered to the second recipient in text format as a facsimile; or wherein the second receiving device is a pager and wherein the translated second broadcast message is delivered to the second recipient in text format.

20. The computer readable storage medium as recited in claim 16, wherein routing includes selecting a format of the translated first broadcast message and a format of the translated second broadcast message for delivery according to receiving capabilities of the first and second receiving devices.

* * * * *